(12) United States Patent
Tanaka et al.

(10) Patent No.: US 6,313,227 B1
(45) Date of Patent: Nov. 6, 2001

(54) PROPYLENE-ETHYLENE BLOCK COPOLYMER, RESIN COMPOSITION, AND BLOW-MOLDED ARTICLE

(75) Inventors: Kenji Tanaka; Yasuhisa Sugita; Masaru Nakagawa; Tetsuya Nakamura, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/722,005

(22) Filed: Nov. 27, 2000

(30) Foreign Application Priority Data

Dec. 17, 1999 (JP) .................................................. 11-359430

(51) Int. Cl.⁷ .......................... C08L 23/12; C08F 110/06
(52) U.S. Cl. .......................... 525/240; 526/351; 526/352; 526/124.2; 526/124.3; 526/124.5; 526/125.1; 526/116
(58) Field of Search .......................... 525/240; 526/351, 526/352, 124.2, 124.3, 124.5, 125.1, 116

(56) References Cited

U.S. PATENT DOCUMENTS

| | | |
|---|---|---|
| 4,565,844 | 1/1986 | Kasahara et al. . |
| 6,201,090 | * 3/2001 | Sumitomo et al. .................. 526/348 |

FOREIGN PATENT DOCUMENTS

| | | |
|---|---|---|
| 56 032516 | 4/1981 | (JP) . |
| 61 136546 | 6/1986 | (JP) . |
| 11 130809 | 5/1999 | (JP) . |
| 11 279369 | 10/1999 | (JP) . |
| 2000 007853 | 1/2000 | (JP) . |
| 2000 119480 | 4/2000 | (JP) . |
| WO 97/38033 | 10/1997 | (WO) . |
| WO 99/65965 | 12/1999 | (WO) . |
| WO 00/60004 | 10/2000 | (WO) . |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

Provided are a propylene-ethylene block copolymer having MFR of from 0.01 to 1.0 g/10 min and comprised of (A) from 85 to 97% by weight a 25° C. xylene-insoluble fraction and (B) from 3 to 15% by weight of a 25° C. xylene-soluble fraction, wherein the fraction (A) is such that its stereospecificity index measured through $^{13}$C-NMR is at least 98.0%, its intrinsic viscosity [η] falls between 2.5 and 5.5 dl/g, and its weight-average molecular weight, Mw, measured through GPC and the content, S, of the fraction having a molecular weight of at most $10^{4.5}$ therein satisfy S (wt. %) $\leq -5.3 \times 10^{-6}$ Mw+7.58, and the fraction (B) is such that its ethylene unit content measured through $^{13}$C-NMR falls between 30 and 70% by weight, and its intrinsic viscosity [η] falls between 2.5 and 9.0 dl/g; and its blow-molded articles. The copolymer has good heat resistance, high rigidity, good impact resistance and good drawdown resistance, and its blow-molded articles have well-balanced rigidity and low-temperature barrier resistance.

7 Claims, 1 Drawing Sheet

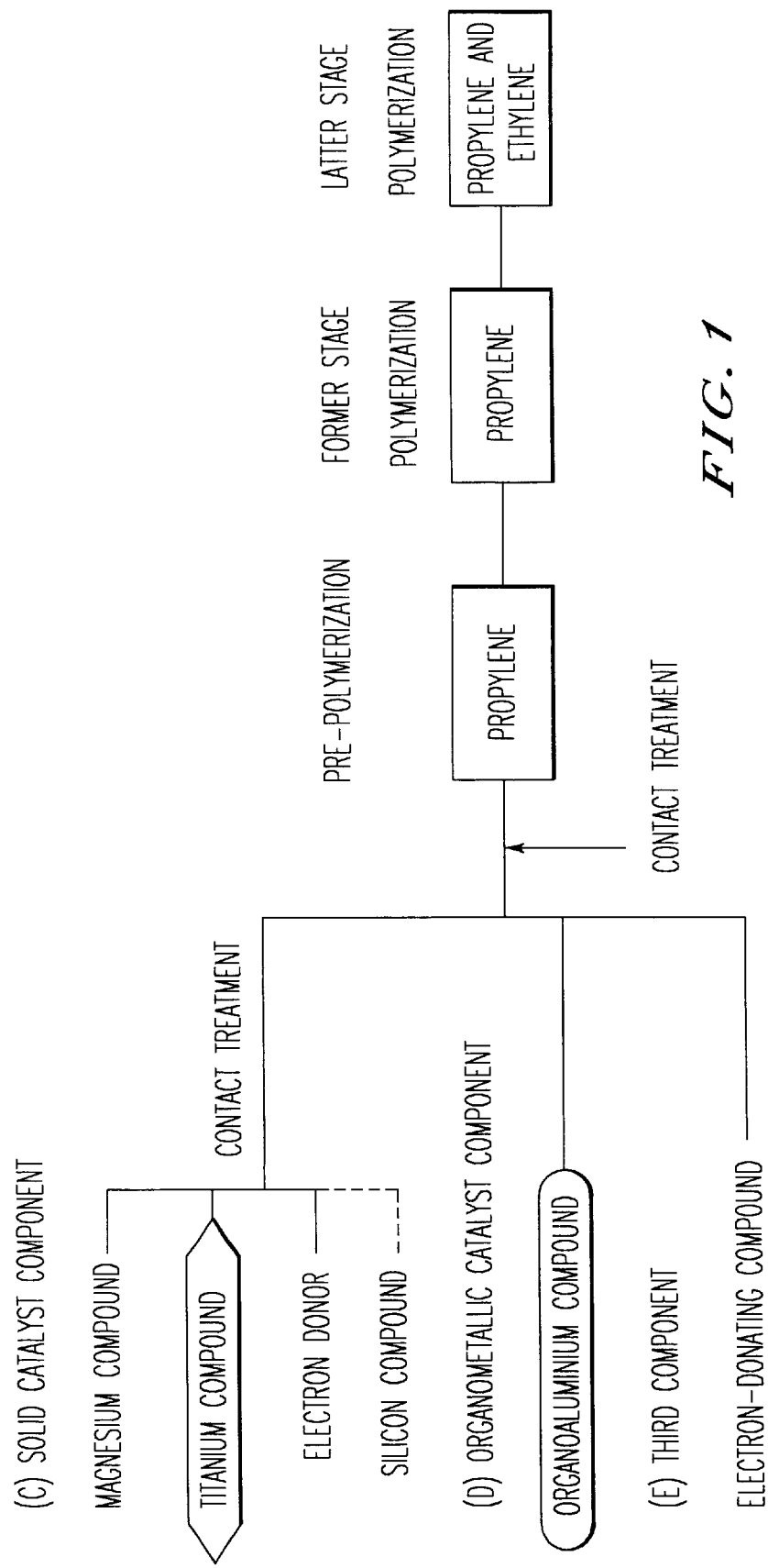

PROPYLENE-ETHYLENE BLOCK COPOLYMER, RESIN COMPOSITION, AND BLOW-MOLDED ARTICLE

BACKGROUND OF THE INVENTION

1. Field of the Invention

The present invention relates to a propylene-ethylene block copolymer, a method for producing it, a resin composition containing the copolymer, and a blow-molded article of the copolymer. More precisely, the invention relates to a propylene-ethylene block copolymer having good heat resistance and good drawdown resistance and having well-balanced rigidity and impact resistance, especially well-balanced rigidity and low-temperature barrier resistance; to an efficient method for producing the copolymer; to a resin composition containing the copolymer; and to a blow-molded article of the copolymer or the resin composition, which is especially favorable to large-size parts of automobiles such as bumpers, etc.

2. Description of the Related Art

As a rule, polypropylene resins have characteristics of low specific gravity, high rigidity, good dimensional stability and good heat resistance. As being general-purpose resins, therefore, they are molded into articles of desired shapes in various molding methods of, for example, extrusion molding, injection molding, blow molding, etc. Above all, blowmolding is much employed for molding large-size structural members such as typically automobile parts, since molds for it are inexpensive and since its process can be simplified by integrating the process steps. However, blow-molded articles of ordinary polypropylene resins are not always satisfactory in point of the moldability, especially the drawdown resistance, and of the balance of rigidity and impact resistance, especially the balance of rigidity and low-temperature barrier resistance. Therefore, various attempts have been made for solving the problem with polypropylene resins by employing multi-stage polymerization for producing the resins and by adding a nucleating agent to the resins (e.g., Japanese Patent Publication No. 74264/1991, Japanese Patent Laid-Open No. 213547/1988). In particular, for large-size blow-molded articles, polypropylene resins are combined with polyethylene resins for improving their drawdown resistance, and inorganic fillers such as talc and the like are added thereto for compensating for the reduction in the rigidity of the resin blends. However, these result in increasing the weight of the resin moldings.

We, the present inventors have previously found out a technique of improving the rigidity and the drawdown resistance of large-size blow-molded articles of polypropylene resins (WO96/02381). With the recent requirements of weight reduction (for example, wall thickness reduction) and weather resistance with automobile materials, desired is further improving the rigidity and the impact resistance, especially the low-temperature barrier resistance of polypropylene resins.

SUMMARY OF THE INVENTION

In that situation, the present invention is to provide a propylene-ethylene block copolymer having good heat resistance and drawdown resistance and having well-balanced rigidity and impact resistance, especially having good low-temperature barrier resistance, a composition containing it, and a blow-molded article of the copolymer or the resin composition especially favorable to large-size parts of automobiles such as bumpers, etc.

We, the present inventors have assiduously studied so as to attain the object as above, and, as a result, have found that a high-stereospecificity propylene-ethylene block copolymer having specific polymer characteristics and a resin composition comprising the copolymer and containing an antioxidant and a nucleating agent can attain the object. We have further found that the propylene-ethylene block copolymer can be efficiently produced through multi-stage polymerization in the presence of a specific catalyst system. On the basis of these findings, we have completed the invention.

Specifically, the invention provides the following:

(1) A propylene-ethylene block copolymer having a melt flow rate (MFR), measured at a temperature of 230° C. and under a load of 2.16 kgf (21.2 N), of from 0.01 to 1.0 g/10 min, and comprised of (A) from 85 to 97% by weight a 25° C. xylene-insoluble fraction and (B) from 3 to 15% by weight of a 25° C. xylene-soluble fraction, wherein the fraction (A) is characterized in that (a-1) its stereospecificity index [mmmm] measured through isotopic carbon nuclear magnetic resonance ($^{13}$C-NMR) is at least 98.0%, (a-2) its intrinsic viscosity [η] measured in tetralin at 130° C. falls between 2.5 and 5.5 dl/g, and (a-3) its weight-average molecular weight, Mw, measured through gel permeation chromatography (GPC), and the content, S (% by weight), of the fraction having a molecular weight of at most $10^{4.5}$ therein satisfy the following formula (I):

$$S \leq -5.3 \times 10^{-6} Mw + 7.58 \qquad (I)$$

where Mw indicates the weight-average molecular weight of the fraction (A), and the fraction (B) is characterized in that (b-1) its ethylene unit content measured through $^{13}$C-NMR falls between 30 and 70% by weight, and (b-2) its intrinsic viscosity [η] measured in tetralin at 135° C. falls between 2.5 and 9.0 dl/g;

(2) A method for producing the propylene-ethylene block copolymer of above (1), for which propylene and ethylene are polymerized through multi-stage polymerization in the presence of a high-stereospecificity catalyst system that comprises (C) a solid catalyst component formed from (c-1) a magnesium compound, (c-2) a titanium compound, (c-3) an electron donor, and optionally (c-4) a silicon compound, (D) an organoaluminium compound, and (E) an electron-donating compound;

(3) A resin composition comprising the propylene-ethylene block copolymer of above (1), an antioxidant, and a nucleating agent;

(4) A blow-molded article of the propylene-ethylene block copolymer of above (1); and (5) A blow-molded article of the resin composition of above (3).

BRIEF DESCRIPTION OF THE DRAWING

FIG. 1 is a flowchart of one example of the method for producing a propylene-ethylene block copolymer of the invention.

DESCRIPTION OF THE PREFERRED EMBODIMENTS

The melt flow rate (MFR) of the propylene-ethylene block copolymer of the invention must fall between 0.01 and 1.0 g/10 min, measured at a temperature of 230° C. and under a load of 2.16 kgf (21.2 N). Propylene-ethylene block copolymers having MFR of lower than 0.01 g/10 min are unfavorable, as the fluidity of their melt is low and their blow moldability is therefore poor. Those having MFR of higher than 1.0 g/10 min are also unfavorable, as their drawdown is large and blow-molding them is therefore difficult. In view of its blow moldability, MFR of the copolymer of the invention preferably falls between 0.05 and 1.0 g/10 min. MFR is measured according to JIS K7210.

The propylene-ethylene block copolymer of the invention is fractionated through solvent fractionation with xylene at 25° C. into (A) a xylene insoluble fraction at 25° C., and (B) a xylene soluble fraction at 25° C. In the invention, the 25° C. xylene-insoluble fraction (A) accounts for from 85 to 97% by weight of the copolymer, and the 25° C. xylene-soluble fraction (B) accounts for from 3 to 15% by weight thereof. Propylene-ethylene block copolymers in which the content of the fraction (B) is smaller than 3% by weight have poor impact resistance; and those in which the content of the fraction (B) is larger than 15% by weight have poor rigidity. For the balance of impact resistance and rigidity of the copolymer of the invention, the fraction (A) and the fraction (B) preferably account for from 87 to 95% by weight of the copolymer, and from 5 to 13% by weight thereof, respectively, more preferably from 88 to 92% by weight of the copolymer, and from 8 to 12% by weight, respectively.

The copolymer is fractionated into 25° C. xylene-insoluble and soluble fractions according to the following method: (1) First, 5±0.05 g of a sample is accurately weighed, and put into a 1000-ml egg-plant type flask, to which is added 1±0.05 g of 2,6-di-tert-butyl-4-methylphenol (BHT, antioxidant). Then, a rotor is inserted into the flask, and 700±10 ml of paraxylene is put thereinto. (2) Next, a condenser is fitted to the top of the flask, and the flask is heated in an oil bath at 140±5° C. for 120±30 minutes with the rotor being driven. In that manner, the sample is dissolved in paraxylene.

(3) Next, the mixture in the flask is poured into a 1000-ml beaker, and kept stirred therein (for at least 8 hours) with a stirrer until it reaches room temperature (25° C.), and thereafter the deposit formed is filtered out through a metal gauze filter. (4) The filtrate is again filtered through a paper filter, and the resulting filtrate is poured into a 3000-ml beaker filled with 2000±100 ml of methanol. The resulting liquid is kept stirred at room temperature (25° C.) with a stirrer for at least 2 hours. (5) Next, the deposit formed is filtered out through a metal gauze filter, and dried in air for at least 5 hours and then in a vacuum drier at 100±5° C. for 240 to 270 minutes to recover the 25° C. xylene-soluble fraction of the sample.

(6) On the other hand, the deposit having been filtered out through the metal gauze filter in the above (3) is again dissolved in paraxylene according to the same steps (1) and (2) as above. While hot, the resulting solution is immediately poured into a 3000-ml beaker filled with 2000±100 ml of methanol, stirred for at least 2 hours with a stirrer, and then left overnight at room temperature (25° C.). (7) Next, the deposit formed is filtered out through a metal gauze filter, and dried in air for at least 5 hours and then in a vacuum drier at 100±5° C. for 240 to 270 minutes to recover the 25° C. xylene-insoluble fraction of the sample.

The 25° C. xylene-soluble content, w (% by weight), of the sample is represented by:

$$w(\% \text{ by weight}) = 100 \times C/A$$

in which A (g) indicates the weight of the sample, and C (g) indicates the weight of the soluble fraction recovered in the step (5). The 25° C. xylene-insoluble content of the sample is represented by (100−w) % by weight.

Of the propylene-ethylene block copolymer of the invention, the 25° C. xylene-insoluble fraction (A) and the 25° C. xylene-soluble fraction (B) must have the following properties:

(A) 25° C. Xylene-insoluble Fraction

The stereospecificity index [mmmm] of the 25° C. xylene-insoluble fraction (A) measured by carbon-13 nuclear magnetic resonance ($^{13}$C-NMR) spectroscopy is more than 98.0%.

The 25° C. xylene-insoluble fraction essentially comprises the segments formed in the step of forming a propylene homopolymer in the method of producing the propylene-ethylene block copolymer as mentioned hereinafter. Its stereospecificity index [mmmm] is referred to as an isotactic pentad, and this indicates the proportion of methyl carbons centered in segments consisted of five continuously meso-bonded polypropylene monomers. Therefore, a higher value of the isotactic pentad in question indicates that the proportion of the polypropylene segments having isotactic structures in the block copolymer is higher. Block copolymers in which the stereospecificity index [mmmm] is smaller than 98.0% are unfavorable, since their balance of rigidity and impact resistance and the their balance of rigidity and heat resistance are not good.

The stereospecificity index is obtained according to the method mentioned below.

In the $^{13}$C-NMR spectrum of the 25° C. xylene-insoluble fraction, the methyl carbon signals are seen as 9 peaks for mmmm, mmmr, rmmr, mmrr, mmrm+rrmr, rmrm, rrrr, mrrr and mrrm that appear from the low magnetic field to the high magnetic field, owing to the influence of the stereospecificity of the ingredient on them. From those 9 peaks, 6 peaks with high intensity of mmmm, mmmr, mmrr, mmrm+rrmr, rrrr and mrrm are extracted, and the stereospecificity index of the insoluble fraction is calculated according to the following formula:

Stereospecificity Index(%)=Lmmmm×100/(Lmmmm+Lmmmr+Lmmrr+L(mmrm+rrmr)+Lrrrr+Lmrrm), wherein Lmmmm, Lmmmr, Lmmrr, L(mmrm+rrmr), Lrrrr and Lmrrm indicate the height from the base line of the peaks for mmmm, mmmr, mmrr, (mmrm+rrmr), rrrr and mrrm, respectively, in the 13C-NMR spectrum. The peak for mmmm is composed of a plurality of separate points with different chemical shifts and peak heights; and the peak for mmmr is on the tail of the main peak for mmmm. Therefore, the height from the base line of the peaks for these mmmm and mmmr is corrected in an ordinary manner.

<Method of $^{13}$C-NMR>

The NMR sample is prepared by dissolving 220 mg of a polymer in 3 ml of a mixed solvent of 1,2,4-trichlorobenzene/deuterio-benzene (90/10 by volume) in an NMR sample tube sealed with a cap at 130° C. $^{13}$C-NMR spectrum was measured under the following conditions:

Apparatus: JEOL's JNM-EX400,

Pulse width: 9 μs (45°),

Pulse repetition time: 4 seconds,

Spectrum width: 20000 Hz,

Temperature: 130° C.,

Number of accumulation: 1000–10000.

All $^{13}$C-NMR spectra referred to herein is measured according to the method mentioned above.

The 25° C. xylene-insoluble fraction has an intrinsic viscosity [η], measured in tetralin at 135° C., of from 2.5 to 5.5 dl/g. Copolymers of which the 25° C. xylene-insoluble fraction has [η] of smaller than 2.5 dl/g are unfavorable, since their drawdown resistance is poor; and those of which the 25° C. xylene-insoluble fraction has [η] of larger than 5.5 dl/g are also unfavorable, since their fluidity and extrudability is low and poor and their productivity is therefore low. The intrinsic viscosity [η] is measured according to ASTM D1601.

Preferably, the ratio, Mw/Mn (molecular weight distribution profile) of the 25° C. xylene-insoluble fraction falls between 2.0 and 10, more preferably between 3.0 and 8.0. Mw indicates the weight-average molecular weight of the ingredient and Mn indicates the number-average molecular weight thereof, both obtained through gel permeation chromatography (GPC). Indispensably, however, the weight-average molecular weight, Mw, measured through gel permeation chromatography (GPC), of the ingredient, and the content, S (% by weight), of the fraction having a molecular weight of at most $10^{4.5}$ in the ingredient satisfy the following formula (I):

$$S \leq -5.3 \times 10^{-6} Mw + 7.58 \quad (I)$$

wherein Mw indicates the weight-average molecular weight of the ingredient. The content of the fraction having a molecular weight of at most $10^{4.5}$ is obtained according to the following formula:

$$S = (A^*/A) \times 100$$

wherein $A^*$ indicates the area for the fraction having a molecular weight of at most $10^{4.5}$ of the GPC curve; and A indicates the total area of the GPC curve.

Of copolymers not satisfying the relationship of formula (I), the low-molecular weight fraction is too much relative to their weight-average molecular weight. Such copolymers are unfavorable, since their impact resistance, elongation at break and low-temperature barrier resistance are low and not good.

The condition for GPC is as follows:
GPC column: TOSO GMHHR-H(S)HT.
Solvent: 1,2,4-trichlorobenzene.
Temperature: 145° C.
Flow rate: 1.0 ml/min.
Detector: RI (Waters' 150 C Model).
Program for analysis: HT-GPC (Ver. 1.0).
The calibration curve for GPC is formed based on standard polystyrene.

(B) 25° C. Xylene-soluble Fraction

The 25° C. xylene-soluble fraction (B) of the propylene-ethylene block copolymer is substantially an amorphous ingredient (rubber ingredient) thereof, essentially comprising the propylene-ethylene random copolymer segments constituting the copolymer.

The 25° C. xylene-soluble fraction has an ethylene unit content, measured through $^{13}$C-NMR, of from 30 to 70% by weight. Copolymers of which the 25° C. xylene-soluble fraction has an ethylene unit content of smaller than 30% by weight are unfavorable since their balance of rigidity and impact resistance, especially their balance of rigidity and low-temperature barrier resistance will be poor; and those of which the 25° C. xylene-soluble fraction has an ethylene unit content of larger than 70% by weight are also unfavorable since their rigidity will be poor. In view of the impact resistance, the low-temperature barrier resistance and the rigidity of the copolymer of the invention, the ethylene unit content of that ingredient of the copolymer preferably falls between 40 and 55% by weight.

The ethylene unit content is obtained according to the method mentioned below.

A sample is subjected to $^{13}$C-NMR, and its $^{13}$C-NMR spectrum is analyzed. From the intensity of 7 peaks appearing in the region of from 21 to 35 ppm [based on the standard of tetramethylsilane (TMS) chemical shift] in the $^{13}$C-NMR spectrum of the sample, the triad chain fraction (mol %) of ethylene (E) and propylene (P) is calculated according to the following formulae:

$$f_{EPE} = [K(T\delta\delta)/T] \times 100,$$

$$f_{PPE} = [K(T\beta\delta)/T] \times 100,$$

$$f_{EEE} = [K(S\gamma\delta)/4T + K(S\delta\delta)/2T] \times 100,$$

$$f_{PPP} = [K(T\beta\beta)/T] \times 100,$$

$$f_{PEE} = [K(S\beta\delta)/T] \times 100,$$

$$f_{PEP} = [K(S\beta\beta)/T] \times 100,$$

provided that $$T = K(T\delta\delta) + K(T\beta\delta) + K(S\gamma\delta)/4 + K(S\delta\delta)/2 + K(T\beta\beta) + K(S\beta\delta) + K(S\beta\beta),$$

wherein $f_{EPE}$ indicates the EPE triad chain fraction (mol %), and $K(T\delta\delta)$ indicates the integrated intensity of the peaks assigned to the $T\delta\delta$ carbon.

From the triad chain fraction obtained as above, the ethylene unit content (% by weight) of the sample is calculated according to the following formula:

Ethylene unit content (% by weight)=$28\{3f_{EEE}+2(f_{PEE}+f_{EPE})+f_{PPE}+f_{PEP}\}\times100/[28\{3f_{EEE}+2(f_{PEE}+f_{EPE})+f_{PPE}+f_{PEP}\}+42\{3f_{PPP}+2(f_{PPE}+f_{PEP})+f_{(EPE+PEE)}\}]$.

The 25+ C. xylene-soluble fraction has an intrinsic viscosity [η], measured in tetralin at 135° C., of from 2.5 to 9.0 dl/g. Copolymers of which the 25° C. xylene-soluble fraction has [η] of smaller than 2.5 dl/g are unfavorable, since their balance of rigidity and impact resistance, especially that of rigidity and low-temperature barrier resistance is not good. On the other hand, copolymers of which the 25° C. xylene-soluble fraction has [η] of larger than 9.0 dl/g are also unfavorable, since the xylene-soluble fraction resides as a mass in their melt because of the large difference of [η] between xylene-soluble and insoluble fractions, and their moldings will have fish eyes. In addition, their balance of rigidity and impact resistance, in particular that of rigidity and low-temperature barrier resistance is not good, and their moldings will have poor appearances. In view of the impact resistance and the low-temperature barrier resistance of the copolymer of the invention and of the appearances of the moldings of the copolymer, [η] of the 25° C. xylene soluble fraction of the copolymer preferably falls between 3.0 and 7.0 dl/g. The intrinsic viscosity [η] is measured according to ASTM D1601.

The propylene-ethylene block copolymer of the invention is a mixture comprising an essential ingredient of propylene homopolymer and a propylene-ethylene random copolymer, and the method for producing it is not limited to any specific one so far as it produces the propylene-ethylene block copolymer having the properties mentioned above. Various methods are employable for producing the copolymer of the invention. According to the method of the invention to be described below, the propylene-ethylene block copolymer having the desired properties as above can be produced efficiently.

The method of the invention comprises polymerizing propylene and ethylene through multi-stage polymerization in the presence of a high-stereospecificity catalyst system that comprises (C) a solid catalyst component formed from (c-1) a magnesium compound, (c-2) a titanium compound, (c-3) an electron donor, and optionally (c-4) a silicon compound, (D) an organoaluminium compound, and (E) an electron-donating compound.

In the high-stereospecificity catalyst system, the magnesium compound of the component (c-1) to be used for forming the solid catalyst component (C) includes, for example, compound of a general formula (II):

$$MgR^1R^2 \tag{II}$$

wherein $R^1$ and $R^2$ each represent a halogen atom, a hydrocarbon group, or an OR group (where R indicates a hydrocarbon group), and they may be the same or different.

In formula (II), the halogen atom for $R^1$ and $R^2$ includes chlorine, bromine, iodine and fluorine atoms. The hydrocarbon group for $R^1$ and $R^2$ and that for R include, for example, an alkyl group having from 1 to 12 carbon atoms, a cycloalkyl group having from 5 to 12 carbon atoms, an aryl group having from 6 to 12 carbon atoms, an aralkyl group having from 7 to 12 carbon atoms, etc.

Specific examples of the magnesium compounds include alkylmagnesiums and arylmagnesiums such as dimethylmagnesium, diethylmagnesium, diisopropylmagnesium, dibutylmagnesium, dihexylmagnesium, dioctylmagnesium, butylethylmagnesium, diphenylmagnesium, dicyclohexylmagnesium, etc.; alkoxymagnesiums and aryloxymagnesiums such as dimethoxymagnesium, diethoxymagnesium, dibutoxymagnesium, dihexoxymagnesium, dioctoxymagnesium, diphenoxymagnesium, dicyclohexoxymagnesium, etc.; alkylmagnesium halides and arylmagnesium halides such as ethylmagnesium chloride, butylmagnesium chloride, hexylmagnesium chloride, isobutylmagnesium chloride, tert-butylmagnesium chloride, phenylmagnesium chloride, benzylmagnesium chloride, ethylmagnesium bromide, butylmagnesium bromide, phenylmagnesium bromide, butylmagnesium iodide, etc.; alkoxymagnesium halides and aryloxymagnesium halides such as butoxymagnesium chloride, cyclohexoxymagnesium chloride, phenoxymagnesium chloride, ethoxymagnesium bromide, butoxymagnesium bromide, ethoxymagnesium iodide, etc.; magnesium halides such as magnesium chloride, magnesium bromide, magnesium iodide, etc.

Of those magnesium compounds, preferred are magnesium halides, alkoxymagnesiums, alkylmagnesiums, and alkylmagnesium halides, in view of the polymerization activity and the stereospecificity of the catalyst.

The magnesium compounds may be prepared from metal magnesium or from other magnesium-containing compounds in producing the component (C). One example of preparing the magnesium compounds comprises contacting metal magnesium with a halogen and an alkoxy group-having compound of a general formula (III):

$$X_nM(OR^3)_{m-n} \tag{III}$$

wherein X represents a hydrogen atom, a halogen atom, or a hydrocarbon group having from 1 to 20 carbon atoms; M represents a boron, carbon, aluminium, silicon or phosphorus atom; $R^3$ represents a hydrocarbon group having from 1 to 20 carbon atoms; m indicates the valency of M; n is an integer of 0 or more but less than m; plural X's, if any, may be the same or different; and plural $OR^3$'s, if any, may be the same or different.

In formula (III), the hydrocarbon group having from 1 to 20 carbon atoms for X and that for $R^3$ include, for example, an alkyl group having from 1 to 20 carbon atoms, such as a methyl group, an ethyl group, an n-propyl group, an isopropyl group, an n-butyl group, an isobutyl group, a hexyl group, an octyl group, etc.; a cycloalkyl group having from 5 to 20 carbon atoms, such as a cyclohexyl group, etc.; an alkenyl group having from 2 to 20 carbon atoms, such as an allyl group, a propenyl group, a butenyl group, etc.; an aryl group having from 6 to 20 carbon atoms, such as a phenyl group, a tolyl group, a xylyl group, etc.; an aralkyl group having from 7 to 20 carbon atoms, such as a benzyl group, a phenethyl group, a 3-phenylpropyl group, etc. Of those, preferred is an alkyl group having from 1 to 10 carbon atoms.

Another example of preparing the component (c-1) comprises contacting a magnesium alkoxide compound of a general formula (IV):

$$Mg(OR^4)_2 \tag{IV}$$

wherein $R^4$ represents a hydrocarbon group having from 1 to 20 carbon atoms, and two $OR^4$'s may be the same or different, with a halide.

In formula (IV), the hydrocarbon group having from 1 to 20 carbon atoms for $R^4$ includes, for example, an alkyl group having from 1 to 20 carbon atoms, such as a methyl group, an ethyl group, an n-propyl group, an isopropyl group, an n-butyl group, an isobutyl group, a hexyl group, an octyl group, etc.; a cycloalkyl group having from 5 to 20 carbon atoms, such as a cyclohexyl group, etc.; an alkenyl group having from 2 to 20 carbon atoms, such as an allyl group, a propenyl group, a butenyl group, etc.; an aryl group having from 6 to 20 carbon atoms, such as a phenyl group, a tolyl group, a xylyl group, etc.; an aralkyl group having from 7 to 20 carbon atoms, such as a benzyl group, a phenethyl group, a 3-phenylpropyl group, etc. Of those, preferred is an alkyl group having from 1 to 10 carbon atoms.

In these methods, the halide includes, for example, silicon tetrachloride, silicon tetrabromide, tin tetrachloride, tin tetrabromide, hydrogen chloride, etc. Of those, preferred is silicon tetrachloride.

One or more of the magnesium compounds as above may be used for the component (c-1) either singly or as combined. The magnesium compounds may be held on a support of, for example, silica, alumina, polystyrene or the like, or may be combined with halogens, etc.

The titanium compound for the component (c-2) to be used for forming the solid catalyst component for use in the invention is not specifically defined, but preferred are compounds of a general formula (V):

$$TiX^1_p(OR^5)_{4-p} \tag{V}$$

In formula (V), $X^1$ represents a halogen atom, and is preferably a chlorine or bromine atom. More preferred is a chlorine atom. $R^5$ represents a hydrocarbon group, which may be saturated or unsaturated, and may be linear, branched or cyclic. It may contain hetero atoms of sulfur, nitrogen, oxygen, silicon, phosphorus, etc. Preferably, $R^5$ is a hydrocarbon group having from 1 to 10 carbon atoms, concretely including an alkyl group, an alkenyl group, a cycloalkyl group, a cycloalkenyl group, an aryl group and an aralkyl group. Especially preferred is a linear or branched alkyl group. Plural —$OR^5$'s, if any, may be the same or different. Specific examples of $R^5$ include a methyl group, an ethyl group, a propyl group, an isopropyl group, a butyl group, an isobutyl group, a pentyl group, a hexyl group, a heptyl group, an octyl group, a decyl group, an allyl group, a butenyl group, a cyclopentyl group, a cyclohexyl group, a cyclohexenyl group, a phenyl group, a tolyl group, a benzyl group, a phenethyl group, etc. p is an integer of from 0 to 4.

Specific examples of the titanium compounds of formula (V) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; monoalkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, dipropoxytitanium dichloride, di-n-butoxytitanium dichloride, diethoxytitanium dibromide, etc.; trialkoxytitanium monohalides such as trimethoxytitanium chloride, triethoxytitanium chloride, tripropoxytitanium chloride, tri-n-butoxytitanium chloride, etc. Of those, preferred are high-halogen titanium compounds, and especially preferred is titanium tetrachloride. One or more of these titanium compounds may be used either singly or as combined.

The electron donor for the component (c-3) to be used for forming the solid catalyst component for use in the invention includes, for example, oxygen-containing electron donors such as alcohols, phenols, ketones, aldehydes, organic acids, esters of organic acids or inorganic acids, and also ethers including monoethers, diethers, polyethers, etc.; and nitrogen-containing electron donors such as ammonia, amines, nitriles, isocyanates, etc. Of those, preferred are polycarboxylates, and more preferred are monoesters and/or diesters of aromatic dicarboxylic acids.

Of monoesters and/or diesters of aromatic dicarboxylic acids, preferred are those in which the organic group in the ester moiety is a linear, branched or cyclic aliphatic hydrocarbon group.

Specific examples of the preferred compounds are dialkyl esters of phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, etc., in which the alkyl group may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, 3-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl, and 3-ethylpentyl groups. Of those, preferred are diphthalates, including, for example, di-n-butyl phthalate, diisobutyl phthalate, di-n-heptyl phthalate, etc.

One or more of these compounds may be used for the component (c-3), either singly or as combined.

For forming the solid catalyst component for use in the invention, a silicon compound is optionally used for the component (c-4). Preferred examples of the silicon compound are compounds of a general formula (VI):

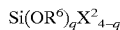

$$Si(OR^6)_q X^2_{4-q} \qquad (VI).$$

With the silicon compound, the activity and the stereospecificity of the catalyst could be improved, and, in addition, the amount of fine powder that may be in the polymers produced could be reduced.

In formula (VI), $X^2$ represents a halogen atom, and is preferably a chlorine or bromine atom, more preferably a chlorine atom. $R^6$ represents a hydrocarbon group, which may be saturated or unsaturated, and may be linear, branched or cyclic. It may contain hetero atoms of sulfur, nitrogen, oxygen, silicon, phosphorus, etc. Preferably, $R^6$ is a hydrocarbon group having from 1 to 10 carbon atoms, concretely an alkyl, alkenyl, cycloalkyl, cycloalkenyl, aryl or aralkyl group. Plural —$OR^6$'s, if any, may be the same or different. Specific examples of $R^6$ include a methyl group, an ethyl group, a propyl group, an isopropyl group, a butyl group, an isobutyl group, an pentyl group, an hexyl group, a heptyl group, an octyl group, a decyl group, an allyl group, a butenyl group, a cyclopentyl group, a cyclohexyl group, a cyclohexenyl group, aphenyl group, a tolyl group, a benzyl group, a phenethyl group, etc. q is an integer of from 0 to 3.

Specific examples of the silicon compounds of formula (VI) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane, tripropoxychlorosilane, etc. Of those, especially preferred is silicon tetrachloride. One or more of these silicon compounds may be used either singly or as combined.

Though not specifically defined, organoaluminium compounds to be used for the component (D) in the high-stereospecificity catalyst system for use in the invention are preferably those containing any of alkyl groups, halogen atoms, hydrogen atoms, and alkoxy groups, as well as aluminoxanes. Concretely, they include trialkylaluminiums such as trimethylaluminium, triethylaluminium, triisopropylaluminium, triisobutylaluminium, trioctylaluminium, etc.; dialkylaluminiummonohalides such as diethylaluminium monochloride, diisopropylaluminium monochloride, diisobutylaluminium monochloride, dioctylaluminium monochloride, etc.; alkylaluminium sesquihalides such as ethylaluminium sesqui-chloride, etc.; linear aluminoxanes such as methylaluminoxane, etc. Of those organoaluminium compounds, preferred are trialkylaluminiums with lower alkyl groups each having from 1 to 5 carbon atoms; and especially preferred are trimethylaluminium, triethylaluminium, tripropylaluminium, and triisobutylaluminium.

One or more of these organoaluminium compounds may be used for the component (D), either singly or as combined.

Preferred examples of the electron-donating compound for the component (E) to be in the high-stereospecificity catalyst system are organosilicon compounds of a general formula (VII):

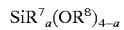

$$SiR^7_a(OR^8)_{4-a} \qquad (VII).$$

In formula (VII), $R^7$ represents a hydrocarbon group having from 1 to 20 carbon atoms, which may be linear, branched or cyclic. It includes, for example, an alkyl group, a cycloalkyl group, an alkenyl group, a cycloalkenyl group, an aryl group, an aralkyl group, etc. $R^8$ represents a hydrocarbon group having from 1 to 4 carbon atoms, which may be linear or branched. It includes, for example, a methyl group, an ethyl group, an n-propyl group, an isopropyl group, etc. a is an integer of from 1 to 3. Plural $R^7$'s, if any, may be the same or different, or may be bonded to each other to form a cyclic structure. Plural —$OR^8$'s, if any, maybe the same or different.

Examples of the organosilicon compounds of formula (VII) include alkylalkoxysilanes such as methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, thexyltrimethoxysilane, methyltriethoxysilane, ethyltriethoxysilane, propyltriethoxysilane, isopropyltriethoxysilane, butyltriethoxysilane, isobutyltriethoxysilane, t-butyltriethoxysilane, thexyltriethoxysilane, propyltripropoxysilane, dimethyldimethoxysilane, diethyldimethoxysilane, dipropyldimethoxysilane, diisopropyldimethoxysilane, dibutyldimethoxysilane, diisobutyldimethoxysilane, di-t-butyldimethoxysilane, ethylmethyldimethoxysilane, t-butylmethyldimethoxysilane, trimethylmethoxysilane, triethylmethoxysilane, tripropylmethoxysilane, triisopropylmethoxysilane, tributylmethoxysilane, etc.; cycloalkylalkoxysilanes such as cyclopentyltrimethoxysilane, cyclopentyltriethoxysilane, cyclohexyltrimethoxysilane, dicyclopentyldimethoxysilane, dicyclohexyldimethoxysilane, etc.; phenylalkylalkoxysilanes such as phenyltrimethoxysilane, phenyltriethoxysilane, diphenyldimethoxysilane, etc. They further include cyclopentylmethyldimethoxysilane, cyclohexylmethyldimethoxysilane, t-butylcyclopentyldimethoxysilane, t-butylcyclohexyldimethoxysilane, cyclohexylcyclopentyldimethoxysilane, 1,1-dimethoxy-2,6-dimethyl-1-silacyclohexane, etc.

Especially preferred examples of organosilicon compounds for use in the invention are represented by the following general formula (VIII):

$$SiR^9{}_2(OR^{10})_2 \qquad (VIII).$$

In formula (VIII), $R^9$ represents a branched chain hydrocarbon or saturated cyclic hydrocarbon group having from 1 to 20 carbon atoms, preferably a tertiary alkyl or cycloalkyl group having from 1 to 20 carbon atoms. $R^{10}$ represents a linear or branched chain hydrocarbon group having from 1 to 4 carbon atoms, preferably a methyl group, an ethyl group, an n-propyl group, an isopropyl group, etc. Two $R^9$'s may be the same or different, or may be bonded to each other to form a cyclic structure. Two —$OR^{10}$'s may be the same or different.

Organosilicon compounds of formula (VIII) include, for example, dicyclopentyldimethoxysilane, dicyclohexyldimethoxysilane, di-t-butyldimethoxysilane, t-butylcyclopentyldimethoxysilane, t-butylcyclohexyldimethoxysilane, cyclopentylthexyldimethoxysilane, cyclohexylthexyldimethoxysilane, cyclohexylcyclopentyldimethoxysilane, dicyclopentyldiethoxysilane, dicyclohexyldiethoxysilane, di-t-butyldiethoxysilane, t-butylcyclopentyldiethoxysilane, t-butylcyclohexyldiethoxysilane, cyclopentylthexyldiethoxysilane, cyclohexylthexyldiethoxysilane, cyclohexylcyclopentyldiethoxysilane, 1,1-dimethoxy-2,6-dimethyl-l-silacyclohexane, etc.

In the invention, one or more of these electron-donating compounds may be used for the component (E), either singly or as combined.

For preparing the solid catalyst component (C) to be in the high-stereospecificity catalyst system for use in the invention, the magnesium compound (c-1), the titanium compound (c-2), the electron donor (c-3) and optionally the silicon compound (c-4) may be contacted with each other in any ordinary manner, and the order of contacting them is not specifically defined. For example, the components may be contacted with each other in the presence of an inert solvent of, for example, hydrocarbons; or they may be previously diluted with an inert solvent of, for example, hydrocarbons, and thereafter contacted with each other. The inert solvent includes, for example, aliphatic hydrocarbons and alicyclic hydrocarbons such as octane, decane, ethylcyclohexane, etc., and their mixtures.

For the reaction, the amount of the titanium compound to be used falls generally between 0.5 and 100 mols, but preferably between 1 and 50 mols, relative to one mol of magnesium in the magnesium compound to be reacted therewith. If the molar ratio oversteps the defined range, the activity of the catalyst to be prepared will be poor. The amount of the electron donor for the reaction falls generally between 0.01 and 10 mols, but preferably between 0.05 and 1.0 mol, relative to one mol of magnesium in the magnesium compound to be reacted therewith. If the molar ratio oversteps the defined range, the activity and the stereospecificity of the catalyst to be prepared will be poor.

The amount of the silicon compound, if used, may fall generally between 0.001 and 100 mols, but preferably between 0.005 and 5.0 mols, relative to one mol of magnesium in the magnesium compound to be reacted therewith. If the molar ratio oversteps the defined range, the activity and the stereospecificity of the catalyst to be prepared could not be well improved, and, in addition, the amount of fine powder in the polymers to be produced will increase.

For preparing the solid catalyst component for use in the invention, the compounds (c-1) to (c-4) are contacted with each other all at a time, at a temperature falling between 100 and 150° C., preferably between 105 and 140° C. If the temperature at which the compounds are contacted with each other oversteps the defined range, the activity and the stereospecificity of the catalyst to be prepared could not be improved satisfactorily. The time for which the compounds are contacted with each other generally falls between 1 minute and 24 hours, preferably between 10 minutes and 6 hours. The pressure for the contacting reaction varies, depending on the type of the solvent, if used, and on the temperature at which the compounds are contacted with each other, but may fall generally between 0 and 5 MPa·G, preferably between 0 and 1 MPa·G. During the contacting operation, it is desirable to agitate the compounds being contacted with each other, for ensuring uniform contact and high contact efficiency.

It is also desirable to contact the titanium compound with the other compounds repeatedly twice or more, whereby the titanium compound could be fully held on the magnesium compound serving as a catalyst carrier.

The amount of the solvent, if used, for the contacting operation may be generally up to 5000 ml, preferably falling between 10 and 1000 ml, relative to one mol of the titanium compound. If the ratio of the solvent used oversteps the defined range, uniform contact could not be effected or, as the case may be, the contact efficiency will be low.

It is desirable that the solid catalyst component having been prepared through the contacting operation as above is washed with an inert solvent at a temperature falling generally between 100 and 150° C., preferably between 120 and 140° C. If the washing temperature oversteps the defined range, the activity and the stereospecificity of the catalyst to be prepared could not be fully improved. The inert solvent includes, for example, aliphatic hydrocarbons such as octane, decane, etc.; alicyclic hydrocarbons such as methylcyclohexane, ethylcyclohexane, etc.; aromatic hydrocarbons such as toluene, xylene, etc.; halogenohydrocarbons such as tetrachloroethane, chlorofluorohydrocarbons, etc.; and their mixtures. Of those, preferred are aliphatic hydrocarbons.

The washing method is not specifically defined, for which preferred is decantation, filtration or the like. The amount of the inert solvent to be used, the washing time, and the number of washing repetitions are not also specifically defined. For example, in one washing operation, from 100 to 100000 ml, preferably from 1000 to 50000 ml of the solvent is used relative to one mol of the magnesium compound used. In general, one washing operation takes 1 minute to 24 hours, preferably 10 minutes to 6 hours. If the amount of the washing solvent to be used and the washing time overstep the defined ranges, the solid catalyst component prepared will be washed insufficiently.

The pressure for the washing operation varies, depending on the type of the solvent used and on the washing temperature, but may fall generally between 0 and 5 MPa·G, preferably between 0 and 1 MPa·G. During the washing operation, it is desirable to agitate the system so as to ensure uniform washing and high washing efficiency.

Preferably, the washing is repeated at least five times for ensuring the favorable result.

The solid catalyst component prepared may be stored in dry in an inert gas atmosphere, or in an inert solvent of, for example, hydrocarbons, etc.

In the invention, the amount of the catalyst components to be used for polymerization is not specifically defined. For example, the solid catalyst component (C) maybe used generally in an amount of from 0.00005 to 1 mmol in terms of the titanium atom therein, per one liter of the reaction capacity; and the amount of the organoaluminium compound (D) may be so controlled that the atomic ratio of aluminium/titanium falls generally between 1 and 1000, preferably between 10 and 500. If the atomic ratio oversteps the defined range, the catalyst activity will be low. The amount of the electron-donating compound for the component (E) may be so controlled that the molar ratio of electron-donating compound (E)/organoaluminium compound (D) falls generally between 0.001 and 5.0, preferably between 0.01 and 2.0, more preferably between 0.05 and 1.0. If the molar ratio oversteps the defined range, the activity and the stereospecificity of the catalyst will be poor. However, in case where the monomers are pre-polymerized in the presence of the catalyst system, the molar ratio could be smaller than the defined range.

For propylene-ethylene block copolymerization to produce the block copolymer of the invention, if desired, propylene may be pre-polymerized prior to the final polymerization of the monomers. This is for ensuring the polymerization activity of the catalyst used, and ensuring the stereospecificity of the block copolymer produced, and for reducing the amount of fine powdery polymer products that may be formed during the copolymerization. For example, propylene is pre-polymerized in the presence of a catalyst having been prepared by blending the solid catalyst component (C), the organoaluminium compound (D) and optionally the electron-donating compound (E) in a pre-determined ratio, at a temperature generally falling between 1 and 100° C. and under a pressure generally falling ordinary pressure and 5 MPa·G or so, and thereafter propylene and ethylene are finally polymerized in the presence of the resulting prepolymer and the components (D) and (E).

In the method for producing the propylene-ethylene block copolymer of the invention, propylene and ethylene are polymerized in a mode of multi-stage polymerization in the presence of the high-stereospecificity catalyst system having been prepared in the manner mentioned above or in the presence of the pre-polymerized product as above and the components (D) and (E). In the latter case where the pre-polymerized product is used, the pre-polymerized product and the components (D) and (E) form the high-stereospecificity catalyst system.

In the method of multi-stage polymerization, preferably, a propylene homopolymer is produced in the former stage and a propylene-ethylene random copolymer in the latter stage. In the method, if further desired, each stage may be composed of two or more polymerization steps. In particular, it is preferable that the former stage of producing a propylene homopolymer is composed of two or more polymerization steps. For the method, the multi-stage polymerization maybe effected batchwise in one and the same polymerization reactor; or may be effected continuously in two or more different polymerization reactors.

For the method, the mode of polymerization is not specifically defined, for which is employable any of vapor-phase polymerization, slurry polymerization, bulk polymerization, solution polymerization, etc. As the case may be, two or more different polymerization modes may be combined for the method. For example, slurry polymerization may be combined with vapor-phase polymerization; or bulk polymerization may be combined with vapor-phase polymerization.

The polymerization condition is described. In case where a propylene homopolymer is prepared in a former polymerization stage, propylene is polymerized with the above-mentioned catalyst system being introduced thereinto at a temperature falling between 0 and 200° C. or so, preferably between 30 and 100° C. or so, and under a pressure falling between atmospheric pressure and 10 MPa·G or so, preferably between 0.2 and 7 MPa·G or so.

For controlling the molecular weight of the homopolymer being produced, a molecular weight-controlling agent such as hydrogen may be introduced into the polymerization system. If desired, the catalyst for polymerization may be pre-polymerized with α-olefins such as ethylene, propylene, 1-butene, 1-hexene, etc.

In case where a propylene-ethylene random copolymer is prepared in a latter polymerization stage, propylene and ethylene are copolymerized in the presence of the catalyst-containing propylene homopolymer having been prepared in the former stage. In general, the propylene-ethylene copolymerization directly follows the former-stage propylene polymerization. For the copolymerization, a mixed gas of propylene and ethylene is introduced into the system, for which the temperature falls preferably between 0 and 200° C., more preferably between 30 and 100° C., and the pressure may fall generally between atmospheric pressure and 10 MPa·G, preferably between 0.2 and 7 MPa·G or so. If desired, a molecular weight-controlling agent such as hydrogen may be introduced into the copolymerization system for controlling the molecular weight of the propylene-ethylene random copolymer being produced.

The ethylene unit content of the propylene-ethylene random copolymer to be produced may be controlled by varying the blend ratio of the mixed gas of propylene and ethylene to be introduced into the system. The copolymerization ratio of the propylene-ethylene random copolymer may be controlled by varying the polymerization time and the polymerization pressure.

FIG. 1 is a flowchart of one example of the method for producing a propylene-ethylene block copolymer of the invention.

The propylene-ethylene block copolymer of the invention obtained in the manner mentioned above has good heat resistance and drawdown resistance and can be molded into large-size blow-molded articles having well-balanced rigidity and impact resistance, especially well-balanced rigidity and low-temperature barrier resistance.

The propylene-ethylene block copolymer of the invention may be a mixture prepared by blending a propylene homopolymer and a propylene-ethylene random copolymer in such a manner that the resulting mixture could have the properties mentioned above.

The resin composition of the invention indispensably comprises the above-mentioned propylene-ethylene block copolymer of the invention, and an antioxidant and a nucleating agent.

For the antioxidant, preferred are phenolic antioxidants, phosphorus-containing antioxidants, etc.

Any known phenolic antioxidants are employable herein, including, for example, 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-2-ethyl-6-t-octylphenol, 2-isobutyl-4-ethyl-6-t-hexylphenol, 2-cyclohexyl-4-n-butyl-6-isopropylphenol, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis (2,4-di-t-butylphenol), 2,2'-butylidenebis (2-t-butyl-4-methylphenol), 1,1,3-tris(2-methyl-4-hydroxy-5-t-butylphenyl)butane, triethylene glycol-bis[3-(3-t-butyl-5-methyl-4-hydroxyphenyl)propionate], 1,6-hexanediol-bis [3-(3,5-di-t-butyl-4-hydroxyphenyl)propionate], 2,2'-thiodiethylenebis[3-(3,5-di-t-butyl-4-hydroxyphenyl) propionate], N,N'-hexamethylenebis(3,5-di-t-butyl-4-hydroxy-hydrocinnamide), diethyl 3,5-di-t-butyl-4-hydroxybenzylphosphonate, 1,3,5-tris(2,6-dimethyl-3-hydroxy-4-t-butylbenzyl)isocyanurate, 1,3,5-tris[(3,5 -di-t-butyl-4-hydroxyphenyl)propionyloxyethyl]isocyanurate, tris(4-t-butyl-2,6-dimethyl-3-hydroxybenzyl)isocyanurate, 2,4-bis(n-octylthio)-6-(4-hydroxy-3,5-di-t-butylanilino)-1, 3,5-triazine, tetrakis[methylene-3-(3,5-di-t-butyl-4-hydroxyphenyl)propionate]methane, calcium bis(ethyl 3,5-di-t-butyl-4-hydroxybenzylphosphonate), nickel bis(ethyl 3,5-di-t-butyl-4-hydroxybenzylphosphonate), glycol bis[3, 3-bis(3-t-butyl-4-hydroxyphenyl)butyrate], N,N'-bis[(3,5-di-t-butyl-4-hydroxyphenyl)propionyl]hydrazine, 2,2'-oxamidobis[ethyl 3-(3,5-di-t-butyl-4-hydroxyphenyl) propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methylphenyl)propionyloxy}ethyl]-2,4, 8,10-tetroxaspiro[5,5]undecane, 2,2-bis[4-(2-(3,5-di-t-butyl-4-hydroxyhydrocinnamoyloxy))ethoxyphenyl] propane, alkyl β-(3,5-di-t-butyl-4-hydroxyphenyl) propionates, n-octadecyl β-(4-hydroxy-3,5-di-t-butylphenyl)propionate, butylated hydroxytoluene, etc.

Of those compounds, preferred are 2,6-di-t-butyl-4-methylphenol, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis [3-(3,5-di-t-butyl-4 -hydroxyphenyl)propionate], N,N'-hexamethylenebis(3,5-di-t-butyl-4-hydroxy-hydrocinnamide), diethyl 3,5-di-t-butyl-4-hydroxybenzylphosphonate, 1,3,5-tris(2,6-dimethyl-3-hydroxy-4-t-butylbenzyl)isocyanurate, 1,3,5-tris[(3,5-di-t-butyl-4-hydroxyphenyl)propionyloxyethyl]isocyanurate, tris (4-t-butyl-2, 6-dimethyl-3-hydroxybenzyl)isocyanurate, 2,4-bis(n-octylthio)-6-(4-hydroxy-3,5-di-t-butylanilino)-1, 3,5-triazine, tetrakis[methylene-3-(3,5-di-t-butyl-4-hydroxyphenyl)propionate]methane, calcium bis(ethyl 3,5-di-t-butyl-4-hydroxybenzylphosphonate), nickel(bis(ethyl 3,5-di-t-butyl-4-hydroxybenzylphosphonate), glycol bis[3, 3-bis(3-t-butyl-4-hydroxyphenyl)butyrate], N,N'-bis[(3,5-di-t-butyl-4-hydroxyphenyl)propionyl]hydrazine, 2,2'-oxamidobis[ethyl 3-(3,5-di-t-butyl-4-hydroxyphenyl) propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3, 9-bis[1,1-dimethyl-2-{β-(3-t-butyl-4-hydroxy-5-methylphenyl)propionyloxy}ethyl]-2,4, 8,10-tetroxaspiro[5,5]undecane, 2,2-bis[4-(2-(3,5-di-t-butyl-4-hydroxyhydrocinnamoyloxy))ethoxyphenyl] propane, alkyl β-(3,5-di-t-butyl-4-hydroxyphenyl) propionates, n-octadecyl β-(4-hydroxy-3,5-di-t-butylphenyl)propionate, butylated hydroxytoluene, etc.

In the alkyl β-(3,5-di-t-butyl-4 -hydroxyphenyl) propionates, the alkyl moiety preferably has at most 18 carbon atoms.

More preferred phenolic antioxidants for use in the invention are 2,6-di-t-butyl-4-methylphenol, tetrakis[methylene-3-(3,5-di-t-butyl-4-hydroxyphenyl)propionate]methane, calcium bis(ethyl 3,5-di-t-butyl-4-hydroxybenzylphosphonate), nickel bis(ethyl 3,5-di-t-butyl-4-hydroxybenzylphosphonate), glycol bis[3,5-bis(4-hydroxy-3-t-butylphenyl)butyrate], N,N'-bis[(3,5-di-t-butyl-4-hydroxyphenyl)propionyl]hydrazine, 2,2'-oxamidobis[ethyl-3-(3,5-di-t-butyl-4-hydroxyphenyl) propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{β-3-t-butyl-4-hydroxy-5-methylphenyl)propionyloxy}ethyl]-2,4, 8,10-tetroxaspiro[5,5]undecane, 1,3,5-tris[(3,5-di-t-butyl-4-hydroxyphenyl)propionyloxyethyl]isocyanurate, 2,2-bis[4-(2-(3,5-di-t-butyl-4-hydroxyhydrocinnamoyloxy)) ethoxyphenyl]propane, n-octadecyl β-(4-hydroxy-3,5-di-t-butylphenyl)propionate, butylated hydroxytoluene, etc.

Any known phosphorus-containing antioxidants are usable herein, including, for example, trioctyl phosphite, trilauryl phosphite, tridecyl phosphite, octyldiphenyl phosphite, tris(2,4-di-t-butylphenyl)phosphite, triphenyl phosphite, tris(butoxyethyl)phosphite, tris(nonylphenyl) phosphite, distearylpentaerythritol diphosphite, tetra (tridecyl)-1,1,3-tris(2-methyl-5-t-butyl-4-hydroxyphenyl) butane diphosphite, tetra(mixed C12–C15 alkyl)-4,4'-isopropylidenediphenyl diphosphite, tetra(tridecyl)-4,4'-butylidenebis(3-methyl-6-t-butylphenol)diphosphite, tris(3, 5-di-t-butyl-4-hydroxyphenyl)phosphite, tris(mono/dimixed nonylphenyl)phosphite, hydrogenated 4,4'-isopropylidenediphenol polyphosphite, bis(octylphenyl-bis [4,4'-butylidenebis(3-methyl-6-t-butylphenyl)]-1,6-hexanediol diphosphite, phenyl-4,4'-isopropylidenediphenol-pentaerythritol diphosphite, tris[4, 4'-isopropylidenebis(2-t-butylphenol)]phosphite, phenyldiisodecyl phosphite, di(nonylphenyl)pentaerythritol diphosphite, tris(1,3-distearoyloxyisopropyl)phosphite, 4,4'-isopropylidenebis(2-t-butylphenol)-di(nonylphenyl) phosphite, 9,10-dihydro-9-oxa-9-oxa-10-phosphaphenanthrene-10-oxide, 4,4'-butylidenebis(3-methyl-6-t-butylphenyl-di-tridecyl phosphite), etc.

Bis(dialkylphenyl)pentaerythritol diphosphites serving as a phosphorus-containing antioxidant and usable herein may be any of those of a spiro-type of the following general formula (IX) or those of a cage-type of the following general formula (X). In general, the phosphites of those types are in the form of mixtures of their isomers by reason of their manufacture.

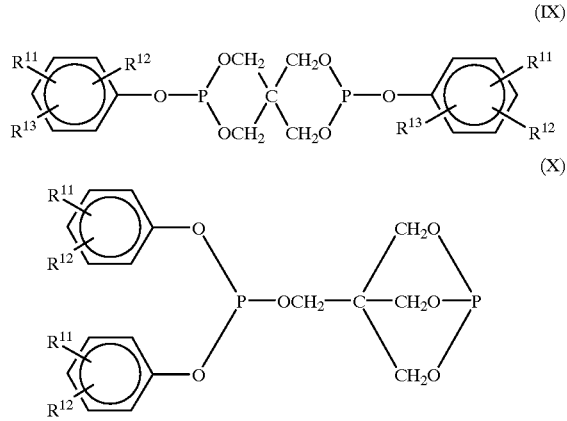

In these, $R^{11}$, $R^{12}$ and $R^{13}$ each represent a hydrogen atom, or an alkyl group having from 1 to 9 carbon atoms, preferably a branched alkyl group, more preferably a tert-butyl group. Most preferably, the substituents are at 2-, 4- and 6-positions on the phenyl group. Preferred phosphites for use herein are bis(2,4-di-t-butylphenyl)pentaerythritol diphosphite, and bis(2,6-di-t-butyl-4-methylphenyl) pentaerythritol diphosphite, as well as phosphonites with carbon and phosphorus atoms being directly bonded to each other, such as tetrakis(2,4-di-t-butylphenyl)-4,4'-biphenylene diphosphonite, etc.

In the invention, one or more of the above-mentioned phenolic antioxidants may be used either singly or as combined; and one or more of the above-mentioned phosphorus-containing antioxidants may also be used either singly or as combined. Preferably, however, at least one phenolic antioxidant is combined with at least one phosphorus-containing antioxidant.

The amount of the antioxidant to be in the resin composition of the invention is not specifically defined, varying depending on different conditions of the composition, but the total of the phenolic antioxidant and the phosphorus-containing antioxidant in the resin composition is generally at least 1500 ppm by weight of the propylene-ethylene block copolymer therein. If the amount is smaller than 1500 ppm by weight, the recyclability of the resin composition for blow molding will be poor and the productivity thereof will be therefore low; but if too large, the molded articles will discolor or the antioxidant will bleed out of their surfaces. Accordingly, the preferred range of the amount of the antioxidant to be added falls between 2000 and 6000 ppm by weight, more preferably between 2500 and 4500 ppm by weight.

The amount of the phenolic antioxidant to be added to the propylene-ethylene block copolymer may be generally at least 500 ppm by weight, preferably from 1000 to 5000 ppm by weight, more preferably from 1500 to 3000 ppm by weight; and that of the phosphorus-containing antioxidant to be added thereto maybe generally at least 500 ppm by weight, preferably from 1000 to 5000 ppm by weight, more preferably from 1500 to 3000 ppm by weight.

The blend ratio of the phenolic antioxidant and the phosphorus-containing antioxidant preferably falls between 1/5 and 5/1, more preferably between 1/3 and 3/1, even more preferably between 1/2 and 2/1 by weight. If the blend ratio of the phenolic antioxidant and the phosphorus-containing antioxidant oversteps the preferred range, the recyclability of the resin composition for blow molding will be poor.

In the invention, any other antioxidants may be used along with the above-mentioned phenolic antioxidant and phosphorus-containing antioxidant. In this case, the total amount of all antioxidants added to the propylene-ethylene block copolymer shall be generally at least 1600 ppm by weight, preferably from 2100 to 10000 ppm by weight, more preferably from 2600 to 4500 ppm by weight of the copolymer. Also in this case, it is desirable that the blend ratio of the phenolic antioxidant and the phosphorus-containing antioxidant falls within the defined range as above.

Antioxidants other than the phenolic antioxidant and the phosphorus-containing antioxidant are preferably thioether antioxidants.

Any known thioether antioxidants are usable herein, including, for example, dilauryl-, dimyristyl-, distearyl- and the like dialkylthio dipropionates, and polyalcohol (e.g., glycerin, trimethylolethane, trimethylolpropane, pentaerythritol, trishydroxyethyl isocyanurate)esters of butyl-, octyl-, lauryl-, stearyl- and the like alkylthiopropionic acids (e.g., pentaerythritol tetralaurylthiopropionate). Concretely, they include dilaurylthio dipropionate, dimyristylthio dipropionate, distearylthio dipropionate, laurylstearylthio dipropionate, distearylthio dibutyrate, etc.

One or more of these thioether antioxidants may be used herein either singly or as combined.

The other indispensable ingredient, nucleating agent to be in the resin composition of the invention is a substance having the ability to nucleate the propylene-ethylene block copolymer in the composition. Any conventional nucleating agents for ordinary polypropylene resins are usable herein with no limitation, so far as they readily induce crystalline nuclei of the propylene-ethylene block copolymer to thereby reduce the degree of supercooling necessary for the crystallization of the copolymer, not interfering with the physical properties of the copolymer. The nucleating agents of that type include, for example, high-melting-point polymers, organic carboxylic acids or their metal salts, organic phosphoric acid compounds or their metal salts, dibenzylidenesorbitols, partial metal salts of rosin acids, fine inorganic particles, imides, amides, quinacridones, quinones, and their mixtures.

Of those, preferred are high-melting-point polymers, metal salts of organic carboxylic acids, fine inorganic particles, metal salts of organic phosphoric acids, and dibenzylidenesorbitols.

High-melting-point polymers usable herein include, for example, polyolefins such as polyethylene, polypropylene, etc.; polyvinylcycloalkanes such as polyvinylcyclohexane, polyvinylcyclopentane, etc.; as well as poly-3-methylpentene-1, poly-3-methylbutene-1, polyalkenylsilanes, etc.

Metal salts of organic carboxylic acids include, for example, aluminium benzoate, aluminium p-t-butylbenzoate, sodium adipate, sodium thiophenecarboxylate, sodium pyrrolecarboxylate, etc.

Examples of fine inorganic particles usable herein are talc, clay, mica, asbestos, glass flakes, glass beads, calcium silicate, montmorillonite, bentonite, graphite, aluminium powder, alumina, silica, diatomaceous earth, titanium oxide, magnesium oxide, pumice powder, pumice balloons, aluminium hydroxide, magnesium hydroxide, basic magnesium carbonate, dolomite, calciumsulfate, potassiumtitanate, bariumsulfate, calcium sulfite, molybdenum sulfide, etc.

Metal salts of organic phosphoric acids include, for example, compounds of a general formula (XI):

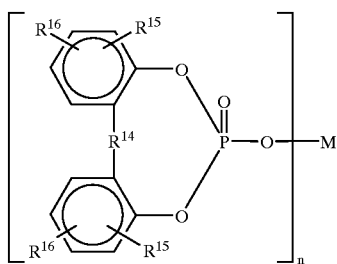

(XI)

wherein $R^{14}$ represents an oxygen or sulfur atom, or a hydrocarbon group having from 1 to 10 carbon atoms; $R^{15}$ and $R^{16}$ each represent a hydrogen atom, or a hydrocarbon group having from 1 to 10 carbon atoms; $R^{15}$ and $R^{16}$ may be the same or different, and $R^{15}$'s, $R^{16}$'s, or $R^{15}$ and $R^{16}$ may be bonded to each other to form a cyclic structure; M represents a mono- to tri-valent metal atom; and n indicates an integer of from 1 to 3; and compounds of a general formula (XII):

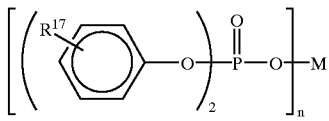

(XII)

wherein $R^{17}$ represents a hydrogen atom, or a hydrocarbon group having from 1 to 10 carbon atoms; M represents a mono- to tri-valent metal atom; and n indicates an integer of from 1 to 3.

Examples of the compounds of formula (XI) are sodium 2,2'-methylenebis(4,6-di-t-butylphenyl)phosphate, sodium 2,2'-ethylidenebis(4,6-di-t-butylphenyl)phosphate, lithium 2,2'-methylenebis(4,6-di-t-butylphenyl)phosphate, lithium 2,2'-ethylidenebis(4,6-di-t-butylphenyl)phosphate, sodium 2,2'-ethylidenebis(4-isopropyl-6-t-butylphenyl)phosphate, lithium 2,2'-methylenebis(4-methyl-6-t-butylphenyl)phosphate, lithium 2,2'-methylenebis(4-ethyl-6-t-butylphenyl)phosphate, calcium bis[2,2'-thiobis(4-methyl-6-t-butylphenyl)phosphate], calcium bis[2,2'-tiobis(4-ethyl-6-butylphenyl)phosphate], calcium bis[2,2'-thiobis(4,6-di-t-butylphenyl)phosphate], magnesium bis[2,2'-thiobis(4,6-di-t-butylphenyl)phosphate], magnesium bis[2,2'-thiobis(4-t-octylphenyl)phosphate], sodium 2,2'-butylidenebis(4,6-dimethylphenyl)phosphate, sodium 2,2'-butylidenebis(4,6-di-t-butylphenyl)phosphate, sodium 2,2'-t-octylmethylenebis(4,6-dimethylphenyl)phosphate, sodium 2,2'-t-octylmethylenebis(4,6-di-t-butylphenyl)phosphate, calcium bis[2,2'-methylenebis(4,6-di-t-butylphenyl)phosphate], magnesium bis[2,2'-methylenebis(4,6-di-t-butylphenyl)phosphate], barium bis[2,2'-methylenebis(4,6-di-t-butylphenyl)phosphate], sodium 2,2'-methylenebis(4-methyl-6-t-butylphenyl)phosphate, sodium 2,2'-methylenebis(4-ethyl-6-t-butylphenyl)phosphate, sodium (4,4'-dimethyl-5,6'-di-t-butyl-2,2'-biphenyl)phosphate, calcium bis[(4,4'-dimethyl-6,6'-di-t-butyl-2,2'-biphenyl) phosphate], sodium 2,2'-ethylidenebis(4-n-butyl-6-t-butylphenyl)phosphate, sodium 2,2'-methylenebis(4,6-dimethylphenyl)phosphate, sodium 2,2'-methylenebis(4,6-diethylphenyl)phosphate, potassium 2,2'-ethylidenebis(4,6-di-t-butylphenyl)phosphate, calcium bis[2,2'-ethylidenebis(4,6-di-t-butylphenyl)phosphate], magnesium bis[2,2-ethylidenebis(4,6-di-t-butylphenyl)phosphate], barium bis[2,2'-ethylidenebis (4,6-di-t-butylphenyl)phosphate], aluminium tris[2,2'-methylenebis(4,6-di-t-butylphenyl) phosphate, aluminium tris[2,2'-ethylidenebis(4,6-di-t-butylphenyl)phosphate], etc. Of those, especially preferred is sodium 2,2'-methylenebis(4,6-di-t-butylphenyl) phosphate.

Examples of the compounds of formula (XII) are sodium bis(4-t-butylphenyl)phosphate, sodium bis(4-methylphenyl) phosphate, sodium bis(4-ethylphenyl)phosphate, sodium bis (4-isopropylphenyl)phosphate, sodium bis(4-t-octylphenyl) phosphate, potassium bis(4-t-butylphenyl)phosphate, calcium bis[bis(4-t-butylphenyl)phosphate], magnesium bis [bis(4-t-butylphenyl)phosphate], lithium bis(4-t-butylphenyl)phosphate, aluminium tris[bis(4-t-butylphenyl)phosphate], etc. Of those, especially preferred is sodium bis(4-t-butylphenyl)phosphate.

For dibenzylidenesorbitols for use herein, for example, preferred are compounds of a general formula (XIII):

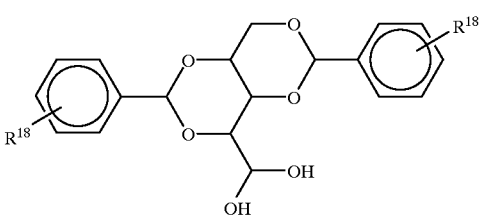

(XIII)

wherein R18 represents a hydrogen atom, a halogen atom, or an alkyl or alkoxy group having from 1 to 10 carbon atoms.

Examples of the compounds of formula (XIII) are 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di-(p-isopropylbenzylidene)sorbitol, 1,3,2,4-di(p-n-butylbenzylidene)sorbitol, 1,3,2,4 -di(p-s-butylbenzylidene) sorbitol, 1,3,2,4-di(p-t-butylbenzylidene)sorbitol, 1,3,2,4-di (2,4-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene) sorbitol, etc. Of those, especially preferred are 1,3,2,4-dibenzylidenesorbitol, 1,3,2,4-di(p-methylbenzylidene) sorbitol, 1,3,2,4-di(p-ethylbenzylidene)sorbitol, 1,3-p-chlorobenzylidene-2,4-p-methylbenzylidenesorbitol, and 1,3,2,4-di(p-chlorobenzylidene)sorbitol.

In the invention, one or more of these nucleating agents may be used either singly or as combined. The amount of the nucleating agent to be in the resin composition of the invention may fall generally between 0.001 and 10 parts by weight, but preferably between 0.01 and 5 parts by weight, more preferably between 0.1 and 3 parts by weight, relative to 100 parts by weight of the propylene-ethylene block copolymer in the composition.

If desired, the resin composition of the invention may optionally contain any additives other than the antioxidant and the nucleating agent, for example, any of heat stabilizers, weather stabilizers, antistatic agents, chlorine-trapping agents, slip agents, flame retardants, colorants, soft elastomers, modifying polyolefins, inorganic or organic fillers, etc.

The method for producing the resin composition of the invention is not specifically defined, and the resin composition may be produced in any known method. Concretely, the resin composition is produced by formulating the propylene-ethylene block copolymer, an antioxidant, a nucleating agent and optionally any other additives, mixing them in a tumbler blender, a Henschel mixer or the like, and thereafter melting, kneading and granulating the resulting mixture by the use of a single-screw or multi-screw extruder, or by melting, kneading and granulating the constituent components all at a time by the use of a kneader, a Banbury mixer or the like.

The resin composition thus obtained has good drawdown resistance and is lightweight. In addition, it has well-balanced rigidity and impact resistance, and well-balanced thermal resistance and impact resistance. It is favorable to blow-molding to give large-size blow-molded articles having a weight of larger than 5 kg.

The blow-molded article of the invention can be produced by blow-molding the resin composition in a known blow-molding apparatus. The molding condition is not specifically defined, and any known condition is employable herein. For example, for extrusion blow-molding, a melt of the resin composition is extruded out through a die, at a temperature not higher than 250° C., but preferably falling between 180 and 230° C., more preferably between 205 and 225° C., to form a tubular parison, then the parison is held in a shaping mold, and air is injected thereinto so that the parison is shaped along the shape of the mold to be a blow-molded article. The lateral draw ratio for the parison preferably falls between one and five times the original length.

During the blow-molding operation, if the resin temperature is higher than 250° C., the resin melt will be much drawn down to cause molding failure; but if lower than 180° C., the resin melt output will be short and the productivity is therefore low.

The blow-molded articles of the invention thus produced in the manner as above have good dimensional stability and heat resistance and have well-balanced rigidity and impact resistance. In addition, their low-temperature barrier resistance is good. Accordingly, they are usable for automobile parts such as bumpers, bumper beams, trunk boards, sheet backs, instrument panels, spoilers, etc. In particular, they are favorable to large-size automobile parts such as bumpers, etc.

EXAMPLES

The invention is described in more detail with reference to the following Examples, which, however, are not intended to restrict the scope of the invention.

The propylene-ethylene block copolymer samples produced in the following Examples were analyzed and tested for their characteristics according to the methods mentioned hereinabove, and the molded articles produced therein were tested for their physical properties according to the methods mentioned below.

(1) Flexural Modulus

According to JIS K7203, injection-molded samples are tested for flexural modulus at 23° C.

(2) Tensile Modulus, and Elongation at Break

According to JIS K7113, injection-molded samples are tested for tensile modulus and elongation at break at 23° C. Samples having a larger degree of elongation at break are better as they could absorb higher impact energy, though the balance of their elongation with other resinous characteristics should be taken into consideration.

(3) Impact Resistance (Izod Impact Strength)

According to JIS K7110, injection-molded samples are tested for notched Izod impact strength at −30° C.

(4) Low-temperature Barrier Resistance (Low-temperature Barrier Test)

According to Part 581 of the Federal Motor Vehicle Safety Standards (FMVSS), bumper beams are tested for barrier resistance. Briefly, a bumper beam to be tested is fitted to a carriage having a weight of 1500 kg, and dashed against a barrier at its center, at a speed of 8 km/hr and at a temperature of −30° C. The thus-dashed bumper beam is checked as to whether and to what degree it has been deformed or broken.

(5) Drawdown Resistance

A resin sample is injected through an accumulator into a mold to give a parison having a predetermined length and a predetermined weight (for a bumper beam of 1400 mm×100 mm×100 mm in size and 10 kg in weight), and the resulting parison is checked for the change of its length for a period of 5 seconds before the mold is closed. The length of the parison after 5 seconds is represented by L; and that of the parison just after having been injected is by $L_0$. Parisons with a smaller value of $L/L_0$ have better drawdown resistance, and are favorable to large-size articles. The molding condition for parisons is the same as in Examples 6, 7 and Comparative Example 7.

(6) Heat Resistance (HDT)

According to JIS K7207 (method B), injection-molded samples were tested for heat resistance.

Preparation Example 1

Preparation of Catalyst A (1) Preparation of Solid Catalyst Component 160 g of diethoxymagnesium was put into a 5-liter three-neck flask with a stirrer that had been purged with nitrogen, to which was added 600 ml of dewatered n-heptane. This was heated at 40° C., and 24 ml of silicon tetrachloride was added thereto, and stirred for 20 minutes. 25 ml of dibutyl phthalate was added thereto. The resulting solution was heated up to 80° C., and 770 ml of titanium tetrachloride was dropwise added thereto through a dropping funnel, and contacted with it at 110° C. for 2 hours.

Next, stirring it was stopped to form a solid precipitate therein. The supernatant was removed, and the precipitate was washed seven times with dewatered n-decane at 110° C. 1220 ml of titanium tetrachloride was added thereto and contacted with it at 110° C. for 2 hours. Then, this was washed six times with dewatered n-decane at 110° C. Thus was obtained a solid catalyst component.

(2) Pre-polymerization

A one-liter three-neck flask with a stirrer was purged with nitrogen, and 48 g of the solid catalyst component prepared in the previous step (1) was put thereinto. 400 ml of dewatered n-heptane was added to it, and heated at 40° C. With stirring it, 2.0 ml of triethylaluminium and 2.8 ml of 1,1-dimethoxy-2,6-dimethyl-1-silacyclohexane were added thereto. Propylene gas was introduced into this under normal pressure, and reacted for 2 hours. Next, the solid component was fully washed with dewatered n-heptane to obtain a catalyst A.

Preparation Example 2

Preparation of Catalyst B (1) Preparation of Solid Catalyst Component 160 g of diethoxymagnesium was put into a 5-liter three-neck flask with a stirrer that had been purged with nitrogen, to which was added 600 ml of dewateredn-decane. This was heated at 40° C., and 24 ml of silicon tetrachloride was added thereto, and stirred for 20 minutes. 16ml of dibutyl phthalate was added thereto. The resulting solution was heated up to 80° C., and 770 ml of titanium tetrachloride was dropwise added thereto through a dropping funnel, and contacted with it at 125° C. for 2 hours.

Next, stirring it was stopped to form a solidprecipitate therein. The supernatant was removed. Then, 100 ml of dewatered n-decane was added to this, and heated up to 135° C. with stirring. This was kept at the elevated temperature for 1 minute, and then stirring it was stopped, whereby this precipitated to give a solid. The supernatant was removed. The washing operation was repeated seven times. Next, 1220 ml of titanium tetrachloride was added to this, which was again heated up to 135° C., at which the compounds were contacted with each other for 2 hours. Next, this was washed six times with dewatered n-decane at 135° C. Thus was obtained a solid catalyst component.

(2) Pre-polymerization

The solid catalyst component prepared in the previous step (1) was processed to produce a catalyst B, in the same manner as in the step (2) in Preparation Example 1.

Preparation Example 3

Preparation of Catalyst C (1) Preparation of Solid Catalyst Component 160 g of diethoxymagnesium was put into a 5-liter three-neck flask with a stirrer that had been purged with nitrogen, to which was added 600 ml of dewatered n-heptane. This was heated at 40° C., and 24 ml of silicon tetrachloride was added thereto, and stirred for 20 minutes. 23 ml of diethyl phthalate was added thereto. The resulting solution was heated up to 80° C., and 770 ml of titanium tetrachloride was dropwise added thereto through a dropping funnel, and contacted with it at 110° C. for 2 hours.

Next, stirring it was stopped to form a solid precipitate therein. The supernatant was removed, and the precipitate was washed seven times with dewatered n-heptane at 90° C. 1220 ml of titanium tetrachloride was added thereto and contacted with it at 110° C. for 2 hours. Then, this was washed six times with dewatered heptane at 90° C. Thus was obtained a solid catalyst component.

(2) Pre-polymerization

A one-liter three-neck flask with a stirrer was purged with nitrogen, and 48 g of the solid catalyst component prepared in the previous step (1) was put thereinto. 400 ml of dewatered n-heptane was added to it. At 10° C., 2.7 ml of triethylaluminium and 2.0 ml of cyclohexylmethyldimethoxysilane were added thereto. Propylene gas was introduced into this under normal pressure, and reacted for 2 hours. Next, the solid component was fully washed with dewatered n-heptane to obtain a catalyst C.

Example 1

6 liters of n-heptane, 10 mmols of triethylaluminium, 2.5 mmols of dicyclopentyldimethoxysilane, and 0.05 mmols (as Ti) of the catalyst A that had been prepared in Preparation Example 1 were put into a 10-liter stainless autoclave with a stirrer. With the liquid phase being kept heated at 80° C., hydrogen was introduced into the autoclave. The hydrogen pressure is indicated in the column for the propylene polymerization stage in Table 1 below. Propylene was continuously introduced into the autoclave to have a pressure of 0.8 MPa, and polymerized for 120 minutes with stirring.

Next, the non-reacted propylene was removed. With the system being kept heated at 57° C., hydrogen was introduced into the autoclave. The hydrogen pressure is indicated in the column for the propylene-ethylene copolymerization stage in Table 1. A mixed propylene/ethylene gas was continuously introduced into the autoclave to have a pressure of 0.6 MPa, and copolymerized for 20 minutes. The blend ratio of propylene/ethylene is indicated in Table 1.

After degassed, the slurry was evaporated to remove the solvent. Thus was obtained a propylene-ethylene block copolymer. Its structure was analyzed, and the data obtained are given in Table 2. To the thus-obtained copolymer, added were 500 ppm by weight of Nippon Yushi's Calcium Stearate G (calcium stearate) serving as a neutralizer; 1000 ppm by weight of Asahi Denka's P-EPQ (tetrakis(2,4-di-tert-butylphenyl) 4,4'-biphenylenediphosphonite), 2000 ppm by weight of Ciba Speciality Chemicals' Irganox 1010 (tetrakis [methylene-3-(3,5-di-tert-butyl-4-hydroxyphenyl) propionate]methane), and 1000 ppm by weight of Ciba Speciality Chemicals' Irgafos 168 (tris (2, 6-di-tert-butylphenyl)phosphite), all serving as an antioxidant; and 2000 ppm by weight of Asahi Denka's Adekastab NA11 (methylenebis(2,4-di-t-butylphenyl) acid phosphate sodium salt) serving as a nucleating agent. These were well mixed, and the resulting mixture was melted, further kneaded and granulated into resin pellets by the use of a double-screw extruder. The pellets were injection-molded into test pieces, and their physical properties were measured. The data obtained are given in Table 3 below.

Example 2

The same process as in Example 1 was repeated. In this, however, the polymerization condition in each stage was varied as in Table 1. The data obtained herein are given in Tables 2 and 3.

Example 3

The same process as in Example 1 was repeated. In this, however, the propylene polymerization was effected in two steps as in Table 1. The data obtained herein are given in Tables 2 and 3.

Example 4

The same process as in Example 1 was repeated. In this, however, the catalyst B prepared in Preparation Example 2 and not the catalyst A was used. The data obtained herein are given in Tables 2 and 3.

Example 5

The same process as in Example 1 was repeated. In this, however, the catalyst B prepared in Preparation Example 2 and not the catalyst A was used, and the polymerization condition in each stage was varied as in Table 1. The data obtained herein are given in Tables 2 and 3.

Comparative Examples 1 to 4

The same process as in Example 1 was repeated. In this, however, the polymerization condition in each stage was varied as in Table 1. The data obtained herein are given in Tables 2 and 3.

Comparative Example 5

The same process as in Example 1 was repeated. In this, however, the catalyst C prepared in Preparation Example 3 and not the catalyst A was used, cyclohexylmethyldimethoxysilane and not dicyclopentyldimethoxysilane was used, and the polymerization condition in each stage was varied as in Table 1. The data obtained herein are given in Tables 2 and 3.

Comparative Example 6

4 liters of n-heptane, 5.7 mmols of diethylaluminium chloride, 0.79 g of titanium trichloride (from Marubeni Sorbay), and 0.2 ml of ε-caprolactone were put into a 10-liter stainless autoclave with a stirrer. With the liquid phase being kept heated at 60° C., hydrogen was introduced into the autoclave. The hydrogen pressure is indicated in the column for the propylene polymerization stage (first step) in Table 1. Propylene was continuously introduced into the autoclave to have a pressure of 0.9 MPa, and polymerized for 90 minutes with stirring. This is the first step polymerization.

Next, the non-reacted propylene was removed. With the system being still kept heated at 60° C., hydrogen was introduced into the autoclave. The hydrogen pressure is indicated in the column for the propylene polymerization stage (second step) in Table 1. Propylene was continuously introduced into the autoclave to have a pressure of 0.7 MPa, and further polymerized for 40 minutes. This is the second step polymerization. Next, the system being kept heated at 57° C., hydrogen was introduced into the autoclave. The hydrogen pressure is indicated in the column for the propylene-ethylene copolymerization stage in Table 1. A mixed propylene/ethylene gas was continuously introduced into the autoclave to have a pressure of 0.5 MPa, and copolymerized for 30 minutes. This is the third step polymerization. The blend ratio of propylene/ethylene is indicated in Table 1.

After degassed, the reaction mixture was stirred together with n-butanol added thereto, at 65° C. for 1 hour, by which the remaining catalyst was degraded. From this, a propylene-ethylene block copolymer was isolated, and then dried and washed. Its structure was analyzed, and the data obtained are given in Table 2.

The copolymer was formed into resin pellets in the same manner as in Example 1, and its physical properties were measured. The data obtained are given in Table 3.

TABLE 1

| | | Condition for Propylene Polymerization Stage | | Condition for Propylene-Ethylene Copolymerization Stage | | |
|---|---|---|---|---|---|---|
| | | Hydrogen Pressure (MPa) | Polymerization Time (min) | Hydrogen Pressure (MPa) | Ethylene Content of mixed ethylene/ propylene gas (vol. %) | Copolymerization Time (min) |
| Example | 1 | 0.012 | 120 | 0.004 | 65 | 20 |
| | 2 | 0.016 | 120 | 0.003 | 65 | 20 |
| | 3 | 0.016 / 0.004 | 100 (1st step) / 20 (2nd step) | 0.004 | 65 | 20 |
| | 4 | 0.012 | 120 | 0.004 | 65 | 20 |
| | 5 | 0.016 | 120 | 0.003 | 65 | 25 |
| Comparative Example | 1 | 0.012 | 120 | 0.004 | 38 | 20 |
| | 2 | 0.012 | 120 | 0.001 | 65 | 20 |
| | 3 | 0.008 | 120 | 0.010 | 65 | 20 |
| | 4 | 0.012 | 120 | 0.004 | 65 | 30 |
| | 5 | 0.001 | 90 | 0.002 | 55 | 20 |
| | 6 | 0.020 / 0.008 | 90 (1st step) / 40 (2nd step) | 0.004 | 65 | 30 |

TABLE 2-1

| | | 25° C. Xylene-Insoluble fraction | | | | | | |
|---|---|---|---|---|---|---|---|---|
| | | Amount (wt. %) | [mmmm] (%) | [η] (dl/g) | Mw | Mw/Mn | Content of Fraction with Mw ≤ $10^{4.5}$ [S] (wt. %) | Right-side Value of Formula (I) |
| Example | 1 | 89.5 | 99.2 | 3.2 | 645000 | 4.2 | 3.4 | 4.2 |
| | 2 | 90.1 | 99.1 | 2.8 | 541000 | 4.3 | 4.0 | 4.7 |
| | 3 | 88.9 | 99.1 | 3.3 | 675000 | 4.9 | 3.3 | 4.0 |
| | 4 | 90.1 | 99.4 | 3.3 | 689000 | 4.1 | 2.5 | 3.9 |
| | 5 | 87.2 | 99.3 | 2.9 | 542000 | 3.9 | 3.1 | 4.7 |
| Comp. | 1 | 89.3 | 99.1 | 3.3 | 669000 | 4.1 | 3.5 | 4.0 |

TABLE 2-1-continued

| | | 25° C. Xylene-Insoluble fraction | | | | | |
|---|---|---|---|---|---|---|---|
| | | Amount (wt. %) | [mmmm] (%) | [η] (dl/g) | Mw | Mw/Mn | Content of Fraction with Mw ≤ $10^{4.5}$ [S] (wt. %) | Right-side Value of Formula (I) |

| | | Amount (wt. %) | [mmmm] (%) | [η] (dl/g) | Mw | Mw/Mn | Content of Fraction with Mw ≤ $10^{4.5}$ [S] (wt. %) | Right-side Value of Formula (I) |
|---|---|---|---|---|---|---|---|---|
| Example | 2 | 89.8 | 99.0 | 3.2 | 652000 | 4.4 | 3.4 | 4.1 |
| | 3 | 90.1 | 99.0 | 4.5 | 975000 | 4.2 | 2.1 | 2.4 |
| | 4 | 84.2 | 96.1 | 3.1 | 636000 | 4.2 | 3.6 | 4.2 |
| | 5 | 90.3 | 96.6 | 2.8 | 571000 | 4.5 | 4.2 | 4.5 |
| | 6 | 88.5 | 97.8 | 3.5 | 635000 | 5.3 | 4.8 | 4.2 |

TABLE 2-2

| | | 25° C. Xylene-Soluble fraction | | |
|---|---|---|---|---|
| | | Amount (wt. %) | Ethylene Unit Content (wt. %) | [η] (dl/g) |
| Example | 1 | 10.5 | 46.1 | 5.4 |
| | 2 | 9.9 | 48.4 | 6.5 |
| | 3 | 11.1 | 44.6 | 5.5 |
| | 4 | 9.9 | 44.3 | 5.7 |
| | 5 | 12.8 | 47.2 | 6.5 |
| Comparative Example | 1 | 10.7 | 24.8 | 5.8 |
| | 2 | 10.2 | 45.6 | 9.3 |
| | 3 | 9.9 | 44.8 | 2.2 |
| | 4 | 15.8 | 42.3 | 5.7 |
| | 5 | 9.7 | 43.2 | 5.2 |
| | 6 | 11.5 | 48.2 | 4.6 |

TABLE 3

| | | | | | | Physical Properties | | |
|---|---|---|---|---|---|---|---|---|
| | | MFR (g/10 min) | Flexural Modulus (MPa) | Tensile Modulus (MPa) | Elongation at break (%) | Izod Impact Strength (−30° C.) (kJ/m²) | Drawdown Resistance L/L₀ | Heat Resistance HDT (° C.) |
| Example | 1 | 0.38 | 1450 | 1560 | 265 | 4.4 | 1.07 | 123.5 |
| | 2 | 0.44 | 1400 | 1530 | 180 | 4.5 | 1.08 | 124.5 |
| | 3 | 0.36 | 1440 | 1470 | 140 | 5.3 | 1.03 | 122.6 |
| | 4 | 0.37 | 1490 | 1630 | 265 | 4.9 | 1.06 | 124.1 |
| | 5 | 0.28 | 1440 | 1550 | 110 | 5.1 | 1.06 | 120.3 |
| Comp. Example | 1 | 0.40 | 1450 | 1570 | 110 | 2.7 | 1.08 | 123.2 |
| | 2 | 0.30 | 1340 | 1450 | 80 | 3.6 | 1.07 | 123.4 |
| | 3 | 0.26 | 1440 | 1590 | 100 | 2.6 | 1.05 | 124.3 |
| | 4 | 0.41 | 1250 | 1380 | 460 | 5.7 | 1.08 | 114.8 |
| | 5 | 0.50 | 1300 | 1470 | 60 | 4.4 | 1.10 | 119.9 |
| | 6 | 0.31 | 1330 | 1420 | 78 | 3.1 | 1.04 | 118.5 |

Examples 6 and 7, Comparative Example 7

Under the same but up-scaled condition as in Examples 1 and 3 and Comparative Example 6, propylene-ethylene block copolymers were produced.

Each copolymer was formed into resin pellets in the same manner as in Example 1.

The resin pellets were blow-molded into automobile bumper beams (1400×100×100 mm in size, 6 kg in weight) under the molding condition and the temperature condition indicated below. The bumper beams were tested for low-temperature barrier resistance. The data obtained are given in Table 4 below.

Molding Condition
Molding machine: 90 mmφ
Screw: 90 mmφ
Die: 100 mmφ
Accumulator capacity: 15 liters
Mold clamping force: 60 tons
Screw revolution: 40 rpm
Motor load: 115 A
Temperature Condition The resin temperature is measured one, and the other temperatures are settled ones. Of the following devices, No. 1 device is adjacent to the hopper.
Cylinder No. 1: 230° C.
Cylinder No. 2: 210° C.
Cylinder No. 3: 190° C.
Cylinder No. 4: 190° C.
Cross-head No. 1: 190° C.
Cross-head No. 2: 190° C.
Cross-head No. 3: 190° C.
Die No. 1: 190° C.
Die No. 2: 190° C.
Cooling time: 200 seconds
Mold temperature: 40° C.
Resin temperature: 225° C.

TABLE 4

| | Barrier Test (−30° C., carriage weight 1500 kg) | |
|---|---|---|
| | Maximum Deformation (mm) | Damage |
| Example 6 | 60 | not damaged |
| Example 7 | 55 | not damaged |

TABLE 4-continued

| | Barrier Test (−30° C., carriage weight 1500 kg) | |
|---|---|---|
| | Maximum Deformation (mm) | Damage |
| Comparative Example 7 | — | seriously damaged |

As described in detail hereinabove with reference to its embodiments, the propylene-ethylene block copolymer of the invention has good heat resistance and good drawdown resistance, and has well-balanced rigidity and impact resistance, especially well-balanced rigidity and low-temperature barrier resistance. Its blow-molded articles are favorable to large-size parts of automobiles such as bumpers, etc. The productivity of such large-size blow-molded articles of the copolymer is high.

What is claimed is:

1. A propylene-ethylene block copolymer having a melt flow rate (MFR), measured at a temperature of 230° C. and under a load of 2.16 kgf (21.2 N), of from 0.01 to 1.0 g/10 min, and comprised of (A) from 85 to 97% by weight a 25° C. xylene-insoluble fraction and (B) from 3 to 15% by weight of a 25° C. xylene-soluble fraction, wherein the fraction (A) is characterized in that (a-1) its stereospecificity index [mmmm] measured through isotopic carbon nuclear magnetic resonance ($^{13}$C-NMR) is at least 98.0%, (a-2) its intrinsic viscosity [η] measured in tetralin at 135° C. falls between 2.5 and 5.5 dl/g, and (a-3) its weight-average molecular weight, Mw, measured through gel permeation chromatography (GPC), and the content, S (% by weight), of the fraction having a molecular weight of at most $10^{4.5}$ therein satisfy the following formula (I):

$$S \leq -5.3 \times 10^{-6} \, Mw + 7.58 \qquad (I)$$

where Mw indicates the weight-average molecular weight of the fraction (A), and the fraction (B) is characterized in that (b-1) its ethylene unit content measured through $^{13}$C-NMR falls between 30 and 70% by weight, and (b-2) its intrinsic viscosity [η] measured in tetralin at 135° C. falls between 2.5 and 9.0 dl/g.

2. A method for producing the propylene-ethylene block copolymer of claim 1, for which propylene and ethylene are polymerized through multi-stage polymerization in the presence of a high-stereospecificity catalyst system that comprises (C) a solid catalyst component formed from (c-1) a magnesium compound, (c-2) a titanium compound, (c-3) an electron donor, and optionally (c-4) a silicon compound, (D) an organoaluminium compound, and (E) an electron-donating compound.

3. A resin composition comprising the propylene-ethylene block copolymer of claim 1, an antioxidant, and a nucleating agent.

4. A blow-molded article of the propylene-ethylene block copolymer of claim 1.

5. A blow-molded article of the resin composition of claim 3.

6. The blow-molded article as claimed in claim 4, which is for bumpers for automobiles.

7. The blow-molded article as claimed in claim 5, which is for bumpers for automobiles.

* * * * *